United States Patent

Kuroda

[11] Patent Number: 5,356,060
[45] Date of Patent: Oct. 18, 1994

[54] STRUCTURE OF CASING OF RADIO PAGER AND CLIP ATTACHABLE THERETO

[75] Inventor: Mituru Kuroda, Tokyo, Japan
[73] Assignee: NEC Corporation, Tokyo, Japan
[21] Appl. No.: 831,959
[22] Filed: Feb. 6, 1992
[30] Foreign Application Priority Data Feb. 6, 1991 [JP] Japan .............................. 3-010344[U]

[51] Int. Cl.$^5$ ................................................ A45F 5/02
[52] U.S. Cl. ................................... 224/252; 224/269; 224/271
[58] Field of Search ............... 224/194, 252, 253, 269, 224/271

[56] References Cited

U.S. PATENT DOCUMENTS

| | | | |
|---|---|---|---|
| 3,209,968 | 10/1965 | Flanagan | 224/269 |
| 4,299,344 | 11/1981 | Yamashita et al. | 224/252 |
| 4,780,934 | 11/1988 | Vickers et al. | 224/252 |
| 4,971,236 | 11/1990 | Grummet | 224/253 |
| 5,235,728 | 8/1993 | Nordberg | 224/252 |

Primary Examiner—Renee S. Luebke
Attorney, Agent, or Firm—Sughrue, Mion, Zinn, Macpeak & Seas

[57] ABSTRACT

A structure of the casing of a radio pager or similar miniature portable apparatus and a clip attachable to the casing. The casing has an elongate groove on the top and a cavity having a generally L-shaped section in a lower end portion of the back. A base plate is complementary in configuration to the back of the casing to be engageable with the latter. The base plate has an engaging portion at the upper end and a bent portion to be received in the cavity at the lower end. After the engaging portion has been engaged with the groove of the casing, the base plate is brought into abutment against the back of the casing. Then, the lower end portion of the base plate is fastened to the casing by a screw.

2 Claims, 4 Drawing Sheets ific portable apparatus and a clip attachable thereto and, more particularly, to a structure which allows a clip to be firmly affixed to the casing of a radio pager while promoting easy attachment and detachment of the clip.

STRUCTURE OF CASING OF RADIO PAGER AND CLIP ATTACHABLE THERETO

BACKGROUND OF THE INVENTION

The present invention relates to the structure of a casing of a miniature portable apparatus and a clip attachable thereto and, more particularly, to a structure which allows a clip to be firmly affixed to the casing of a radio pager while promoting easy attachment and detachment of the clip.

A wide variety of miniature portable apparatuses are extensively use today and include radio pagers and audio apparatus. A radio pager, for example, may be provided with a clip to be put in the user's chest pocket or on the user's waist belt. The clip is attached to the casing of such a radio pager. Specifically, the casing is usually made of plastic and provided with an elongate groove on the top thereof and an elongate lug on the bottom, while an elastic bate plate is made of metal and provided with an engaging portion engageable with the groove in a upper end portion thereof and a slot engageable with the lug in a generally J-shaped lower end portion. The clip has a clip body which is rotatably supported by the base plate. To attach the clip to the casing, the engaging portion of the base plate is put in the groove of the casing, and then the base plate is rotated about the groove. As a result, the slot of the base plate mates with the lug of the casing due to the resiliency of the base plate. To remove the clip from the casing, the lower end portion of the base plate is urged away from the casing by, for example, a tool to release the slot from the lug.

However, the problem with the conventional clip structure is that the edge of the lower end of base plate moves in contact with the casing in the event when the clip is attached to or detached from the casing, scratching or even breaking the casing. Another problem is that the resiliency of the base plate used to attach and detach the clip from the casing is apt to differ from one base plate to another for production reasons. Therefore, some base plate come off the casing rather easy, while other are difficult to remove from the casing. In addition, since the edge of the base plate is forcibly urged away from the casing by a tool, it is likely that the casing is scratched or the base plate is deformed.

SUMMARY OF THE INVENTION

It is, therefore, an object of the present invention to provide an improved structure of the casing of a radio pager and a clip attachable thereto which allows the clip to be firmly affixed to the casing while promoting easy attachment and detachment of the clip without scratching the casing or deforming a base plate or without impairing the appearance.

In accordance with the present invention, in a structure of a box-like casing of a portable apparatus and a clip attachable thereto, the casing comprises an elongate groove formed on the top, and a cavity formed in a lower end portion of the back. The clip comprises a base plate complementary in configuration to the back of the casing and having an engaging portion engageable with the groove at the upper end, a bent portion at the lower end, and a screw hole in the bent portion, and a clip body supported by the base plate and rotatable to be attached and detached from one who carries the apparatus.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
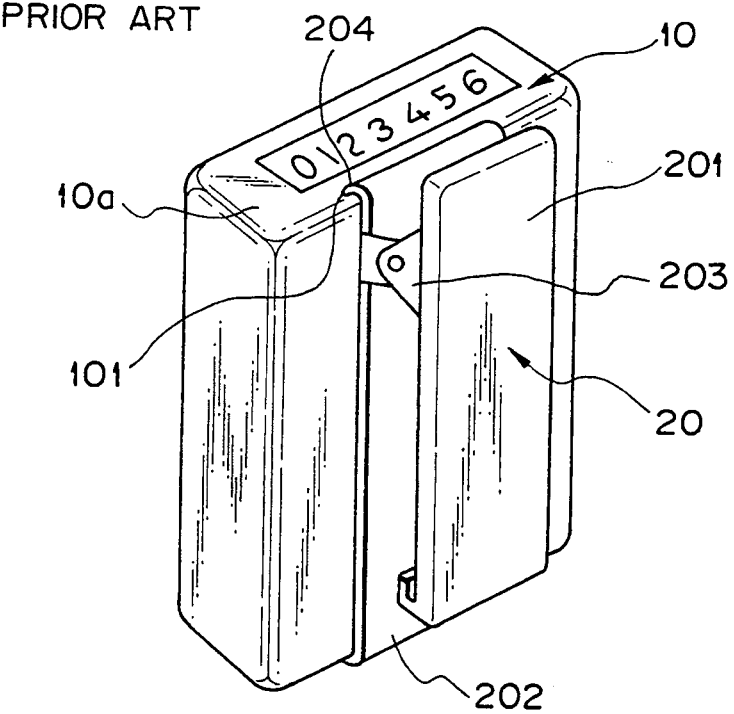
FIG. 1 is a perspective view of a conventional structure of the casing of a radio pager and a clip attachable thereto.
Figure 2:
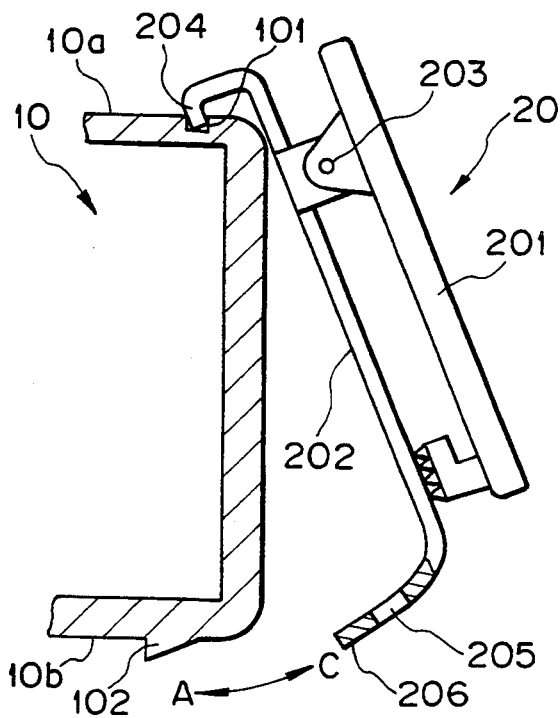
FIG. 2 is a fragmentary section showing the conventional clip not attached to the casing.
Figure 3:
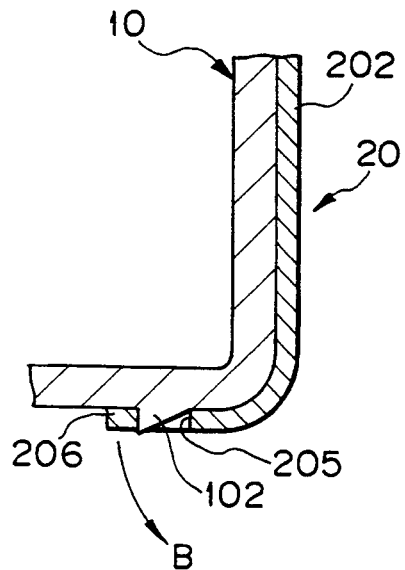
FIG. 3 shows is a view similar to FIG. 2, showing the clip attached to the casing.

To better understand the present invention, a brief reference will be made to a conventional casing and clip of a radio pager, shown in FIGS. 1-3. As shown, the radio pager has a casing 10 which is made of plastic and formed with an elongate groove 101 on the top 10a and an elongate lug on the bottom 10b. A clip 20 is made up of a clip body 201 and a resilient base plate 202 made of metal and supporting the clip 201 such that the clip 201 is rotational about a pin 203. The base plate 202 has an engaging portion 204 engageable with the groove 101 of the casing 10 at the upper end and a slot 205 engageable with the lug 102 at the lower end. To attach the clip 20 to the casing 10, the engaging portion 204 of the base plate 202 is put in the groove 101 of the casing 10, and then the base plate 202 is rotated in a direction indicated by an arrow A in FIG. 2. As the lower end of the base plate 202 is moved along the bottom 10b of the casing 10 while deforming due to resiliency, the slot 205 of the base plate 202 mates with the lug 102 of the casing 10. To remove clip 20 from the casing 10, the edge 206 of the lower end of the base plate 202 is urged by, for example, a tool in a direction indicated by an arrow B in FIG. 3 until the slot 205 has been released from the lug 102. Then, the base plate 202 is rotated by being fulcrumed by the groove 101 in a direction C shown in FIG. 2.

However, the problem with the conventional clip structure is that the edge 206 of the lower end of base plate 202 moves in contact with the casing 10 in the event that the clip 20 is attached to or detached from the casing 10, scratching or even breaking the casing 10. Another problem is that the resiliency of the base plate 202 used to attach and detach the clip 20 from the casing 10 is apt to differ from one base plate to another for production reasons. Therefore, some base plates are easy to pull off the casing 10 while others are difficult to remove from the casing 10. In addition, since the edge 206 of the base plate 202 is forcibly urged away from the casing 10 by a tool, it is likely that the casing 10 is scratched or the base plate 202 is deformed.

Figure 4:
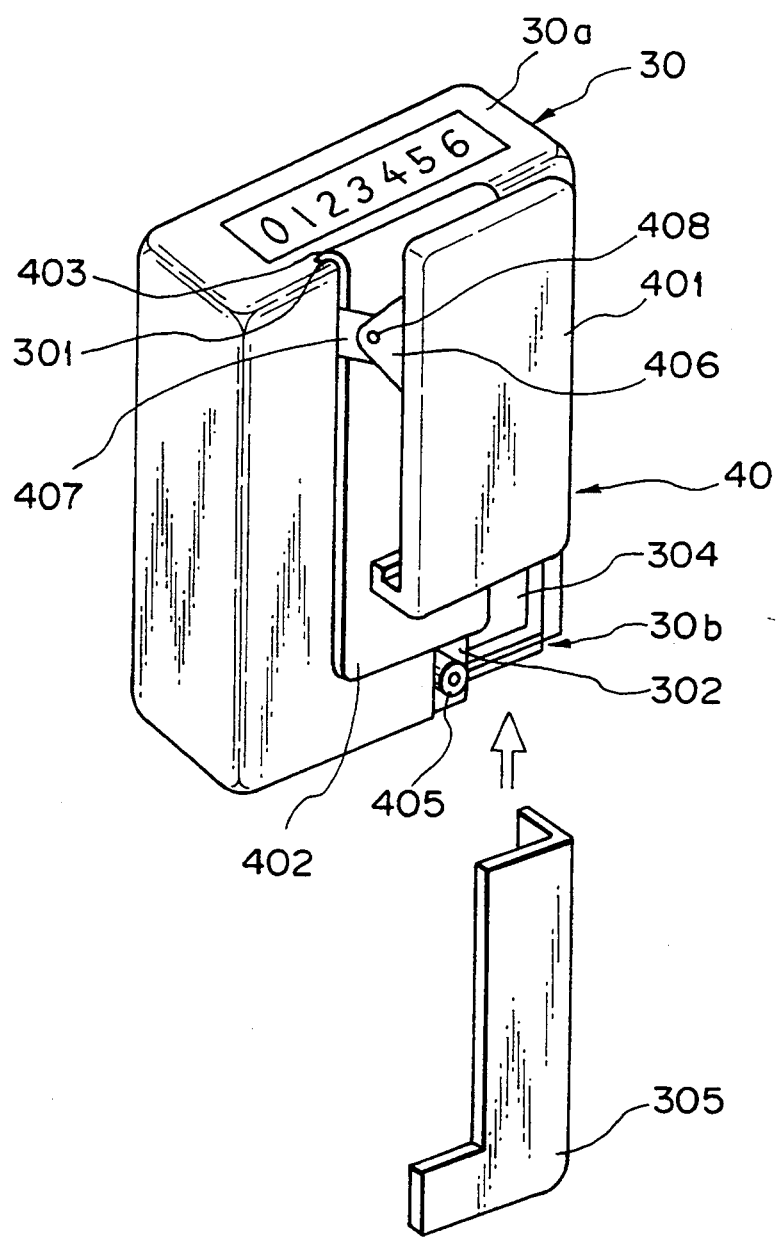
FIG. 4 is a perspective view showing a structure embodying the present invention.
Figure 5:
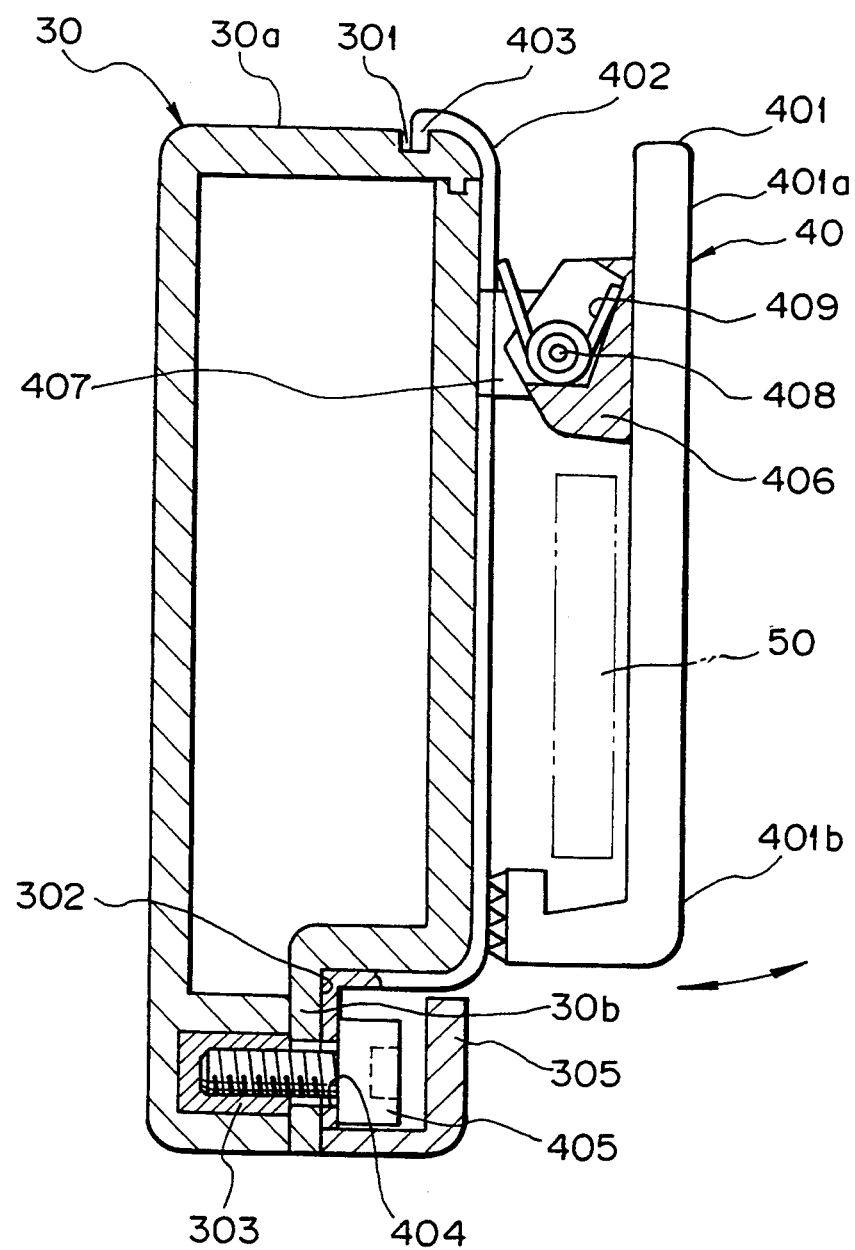
FIG. 5 is a partly sectioned side elevation showing a clip of the embodiment attached to a casing.
Figure 6A:
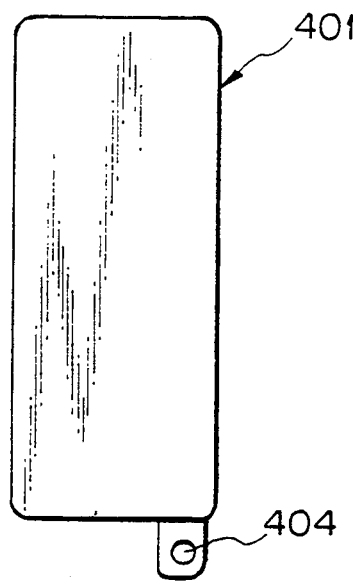
FIGS. 6A-6D are respectively a front view, side elevation, rear view and a plan view showing the clip shown in FIGS. 4 and 5.
Figure 6B:
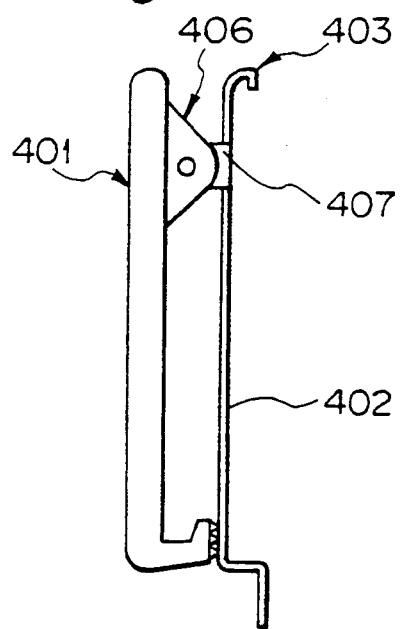
Figure 6C:
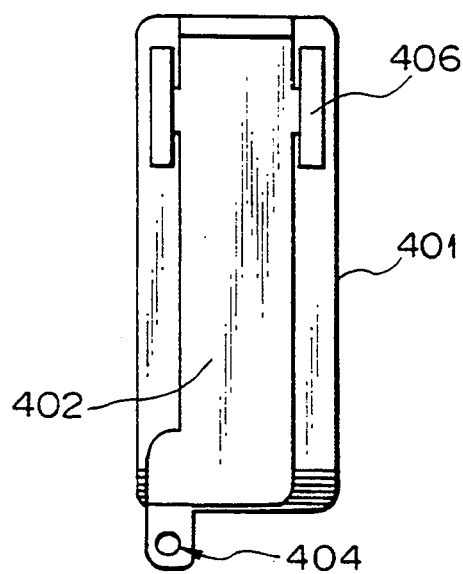
Figure 6D:
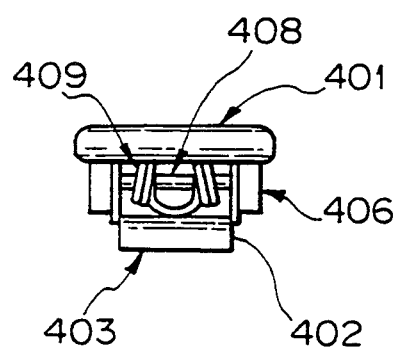

Referring to FIGS. 4 and 5, a casing and a clip embodying the present invention will be described. While the following description concentrates on a radio pager, the present invention is, of course, applicable to other various kinds of miniature portable apparatuses. As shown, the radio pager has a box-like casing 30 which is formed with an elongate groove 301 on the top 30a and a cavity 302 in a lower end portion 30b of its back. A female screw 303 is buried in or formed in the rear or base portion of the cavity 302. As shown in FIG. 4, the cavity 302 should preferably adjoin a battery containing section 304. A battery cover 305 covers the cavity 302 and battery containing section 304 when attached to the casing 30. This prevents the cavity 302 and battery containing section 304 from showing themselves and thereby insures the attractive appearance of the casing 30.

On the other hand, a clip 40 attachable to the casing 30 has a clip body 401 and a base plate 402. The upper end of the base plate 402 is bent to form an engaging portion 403 engageable with the groove 301 of the casing 30. Likewise, the lower end of the base plate 402 is so bent as to be received in the cavity 302 of the casing 30. A screw hole 404 is formed through the lower end of the base plate 402 in a position aligning with the threaded hold 303 buried in or formed in the rear or base portion of the cavity 302. A screw 405 is driven into the threaded hole 303 via the screw hole 404 for fastening the base plate 402 to the casing 30. From a mechanical strength standpoint, the base plate 402 should preferably be made of metal. However, the base plate 402 may be made of any other suitable material such as plastic since the embodiment does not rely on resiliency in fixing the base plate 402 to the casing 30. The clip body 401 has a bearing portion 406 on the inner periphery thereof while the base plate 402 has a pair of posts 407. The bearing portion 406 is rotatably mounted on the posts 407 by a pin 408. A coil spring 409 is loaded between the bearing portion 406 of the clip body 401 and the base plate 402 with the intermediary of the pin 408. When the upper end 401a of the clip body 401 is pressed by hand, the lower end 401b of the clip body 401 rotates away from the casing 30 about the pin 408. As a result, the clip 40 opens in a butterfly fashion and can be fitted on, for example, the user's waist belt 50.

FIGS. 6A-6D show the clip 40 having the above structure in a front view, side elevation, rear view, and top plan view, respectively.

To affix the clip 40 to the casing 30, the engaging portion 403 provided on the upper end of the base plate 402 is caused to mate with the groove 301 of the casing 30, and then the base plate 402 is rotated by being fulcrumed by the groove 301 until it abuts against the back of the casing 30. Subsequently, the screw 405 is driven into the threaded hole 303 of the casing 30 via the screw hole 404 of the base plate 402, whereby the clip 40 is affixed to the casing 30. To remove the clip 40 from the casing 30, the screw 405 should only be driven out of the threaded hole 303. Specifically, when the screw 405 is removed from the threaded hole 303, the engaging portion 403 of the base plate 402 is unlocked from the groove 301 of the casing 30 to allow the clip 40 to be released from the casing 30.

In summary, it will be seen that the present invention allows a clip to be easily attached and detached from the casing of a radio pager or similar portable apparatus without scratching the casing or deforming the base plate of the clip. Since the clip can be firmly and surely affixed to the casing, it does not come off the casing even when the casing is dropped by accident.

Various modifications will become possible for those skilled in the art after receiving the teachings of the present disclosure without departing from the scope thereof.

What is claimed is:

1. In a structure of a box-like casing of a portable apparatus and a clip attachable to said casing;
   said casing comprising:
   a top and a back;
   an elongate groove formed on the top; and
   a cavity formed in a lower end portion of the back;
   said clip comprising:
   a base plate complementary in configuration to the back of said casing and having an engaging portion engageable with said groove at a upper end, a bent portion at a lower end and which is received in said cavity of said casing, and a screw hole in said bent portion; and
   a clip body supported by said base plate and rotatable to be attached and detached from one who carries said apparatus;
   wherein said casing further comprises a threaded hole provided on a rear portion of said cavity in alignment with said screw hole, whereby a screw is driven into said threaded hole via said screw hole for fastening said clip to said casing.

2. A structure as claimed in claim 1, wherein said casing further comprises a battery cover forming part of the back of said casing and covering said cavity and said screw.

* * * * *

UNITED STATES PATENT AND TRADEMARK OFFICE
CERTIFICATE OF CORRECTION

PATENT NO. : 5,356,060
DATED : October 18, 1994
INVENTOR(S) : Mituru Kuroda

It is certified that error appears in the above-identified patent and that said Letters Patent is hereby corrected as shown below:

Col. 1, line 42, before "come" delete "plate" and insert therefor --plates--.

Signed and Sealed this

Twentieth Day of December, 1994

Attest:

BRUCE LEHMAN

Attesting Officer     Commissioner of Patents and Trademarks